United States Patent [19]
McGuffey

[11] 3,792,211
[45] Feb. 12, 1974

[54] IMPACT FIRE SAFETY SWITCH

[76] Inventor: Jesse E. McGuffey, Rt. No. 1, Blue Ridge, Tex. 75004

[22] Filed: Mar. 26, 1973

[21] Appl. No.: 344,572

[52] U.S. Cl. .......................... 200/61.45 R, 200/61.5
[51] Int. Cl. ............................................ H01h 35/14
[58] Field of Search........ 200/61.45 R, 61.48, 61.52

[56] References Cited
UNITED STATES PATENTS
3,479,475  11/1969  Buck ............................ 200/61.45 R
2,291,236  7/1942  Kilgour ......................... 200/61.5 X
3,518,385  6/1970  Boudes et al. ............... 200/61.45 R
3,560,681  2/1971  Webber......................... 200/61.45 R

*Primary Examiner*—James R. Scott
*Attorney, Agent, or Firm*—Head & Johnson

[57] ABSTRACT

An impact fire safety for use with an engine driven vehicle having a vehicle electrical system and an engine ingnition system, including switch means in the electrical system, each switch means having an actuated and a deactuated position and means of deactuating both switch means on impact of the vehicle.

4 Claims, 8 Drawing Figures

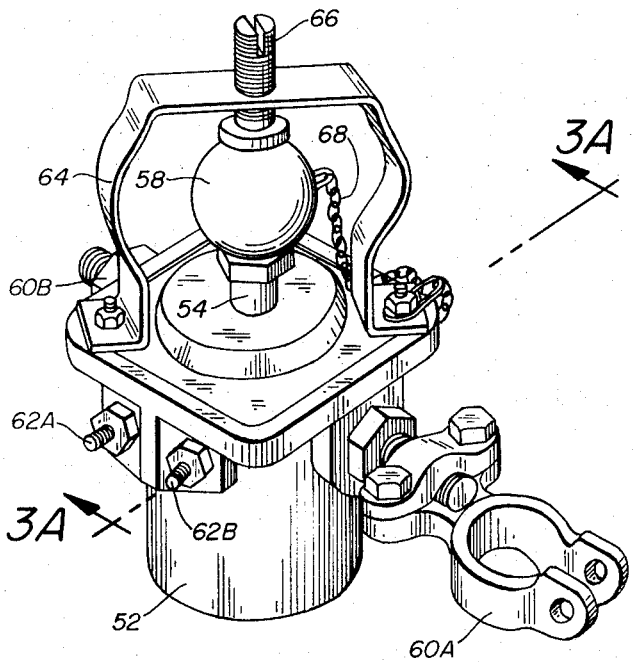
FIG. 3
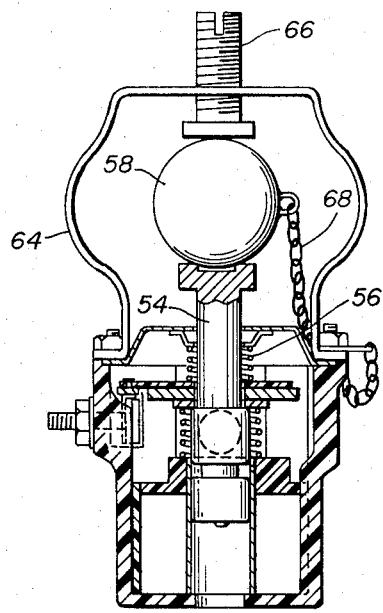
FIG. 3A
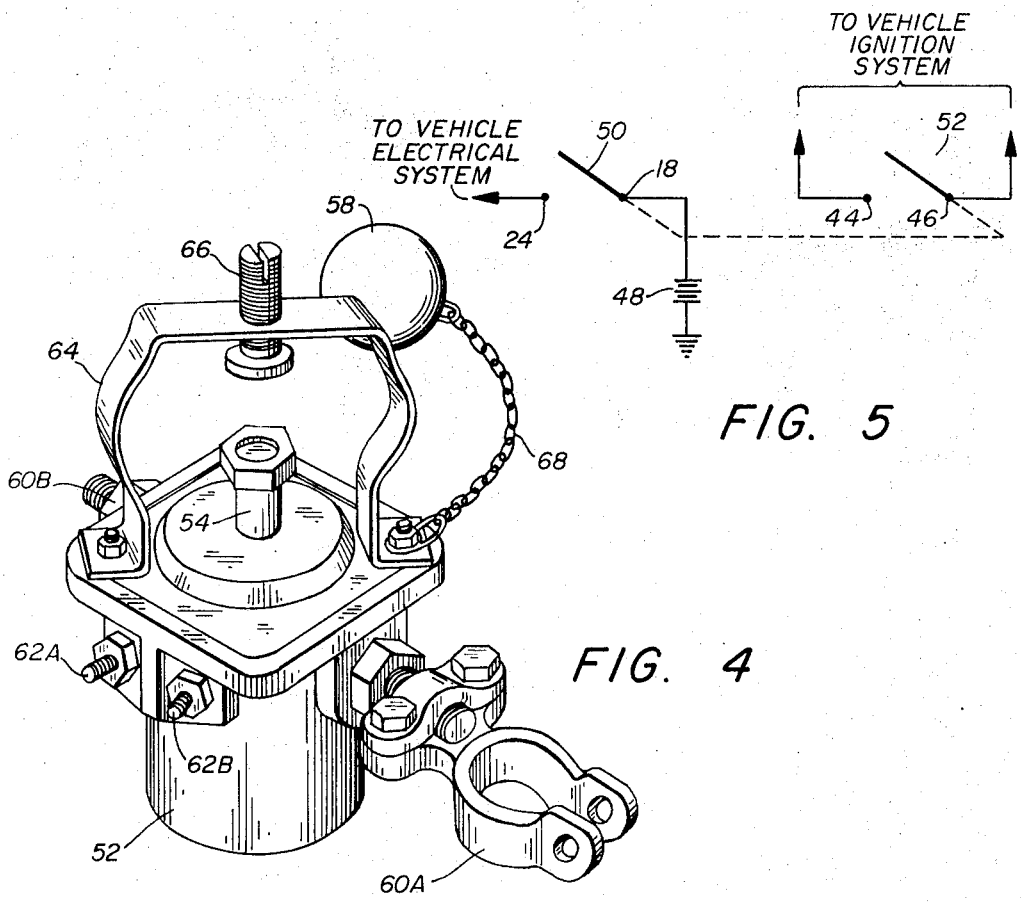
FIG. 4
FIG. 5

3,792,211

IMPACT FIRE SAFETY SWITCH

BACKGROUND, SUMMARY AND OBJECTS OF THE INVENTION

Automobile accidents are a primary source of injury and death in the United States and in all countries having a high density of engine driven vehicles. One of the primary contributing factors to automobile deaths is that of the victim becoming trapped inside vehicles and subsequently burned by a fire caused as a result of the accident. Gasoline and oil carried by vehicles are easily ignited and spread as a result of a vehicle accident. Since the vehicle engine is likely to remain in a running condition immediately following an accident combustible vapors are easily ignited. In addition, any short circuit in the vehicle electrical system can quickly ignite gas fumes.

The present invention is directed towards improving the safety of engine driven vehicles by substantially eliminating the major causes of fire as a consequence of vehicle accidents. It is therefore an object of this invention to provide a safety device for use with engine driven vehicles.

More particularly, an object of this invention is to provide a fire safety switch for engine driven vehicles including means of disconnecting the vehicle electrical system upon vehicle impact.

Another object of this invention is to provide a fire safety switch for engine driven vehicles, including means of automatically disconnecting the vehicle electrical system and vehicle ignition system upon vehicle impact and wherein the means is inexpensive and easily returned to the actuated position after a vehicle impact.

These general objects as well as more specific objects will be fulfilled in the apparatus described in the following description and claims, taken in conjunction with the following drawings.

DESCRIPTION OF THE VIEWS

FIG. 3 is an isometric external view of an alternate embodiment of the vehicle fire safety switch of this invention.

FIG. 3A is a cross sectional view taken along the line 3A—3A of FIG. 3 showing the internal arrangement of the switch.

FIG. 4 is an isometric view of the alternate embodiment of the switch as shown in FIG. 3 but showing the switch in the deactuated condition as would occur upon vehicle impact.

FIG. 5 is a wiring diagram showing the switch as employed in the electrical and ignition systems of a vehicle.

DETAILED DESCRIPTION

Figure 1:
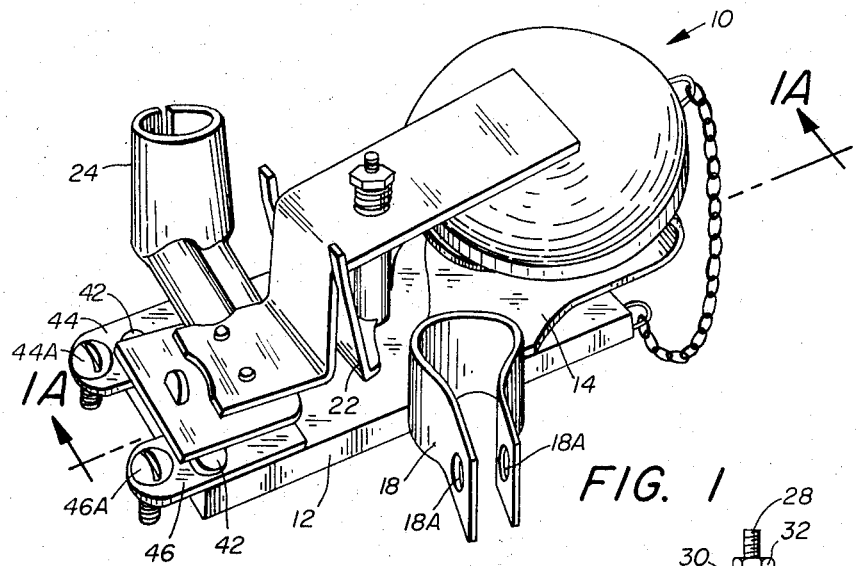
FIG. 1 is an isometric view of one embodiment of the impact fire safety switch of this invention.
Figure 1A:
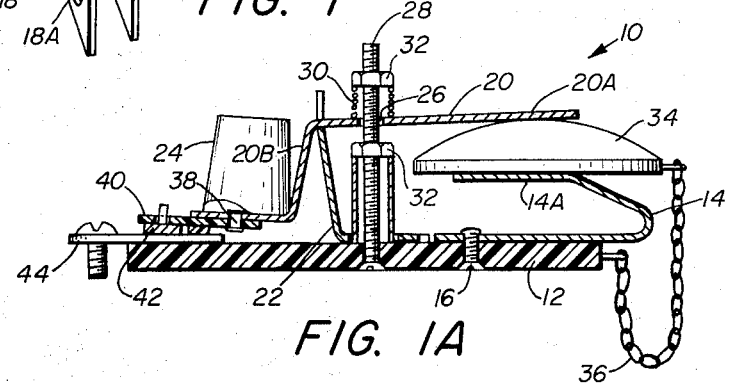
FIG. 1A is a cross sectional view taken along the line 1A—1A of FIG. 1 showing more details of the fire safety switch.

Referring to the drawings and first to FIG. 1 and 1A one embodiment of the invention is shown. The switch is indicated generally by the numeral 10 and is arranged so that it can be attached directly to one pole of a typical vehicle battery. The switch 10 includes a base 12 preferably of some nonconductive material such as plastic. A first system electrical bus 14 is supported to base 12, such as by means of a rivet or bolt 16. A portion of bus 14 as shown in FIG. 1 includes an integrally formed clip 18 which may be attached directly to the post of a vehicle battery. The clip 18 is held to the battery by means of a bolt (not shown) extending through opening 18A. In this way the fire impact safety switch may be attached directly to the battery of a vehicle and thereby needs no other mounting or support. However, this arrangement is not critical to the invention and it can be seen that the base 12 can be attached to any other portion of the vehicle with the bus 14 connected by a cable to the battery post.

The bus 14 is a U-shaped configuration having an upper portion 14A. Parallel to it is a pivoting second bus 20. The second bus is pivotally supported by an upstanding post 22 secured to base 10. The second bus 20 has a forward parallel portion 20A and a rearward portion 20B, the portions 20A and 20B being on opposite sides of the pivot post 22. The forward parallel portion 20A of the second bus 20 is spaced opposite and generally parallel to the portion 14A of the first bus 14. The rearward portion 20B includes an integral connector receiving post 24 of a size and dimension equal to that of a typical vehicle battery post. Thus in the embodiment as illustrated the device may be easily applied to an existing vehicle by removing the vehicle connector from one post of a battery, inserting clip 18 over the vacant battery post and attaching it securely to the post and then attaching the cable connector to the post portion 24.

The second bus 20 has an opening 26 therein receiving upstanding bolt 28. A spring 30 is positioned around the bolt 28 and on top of the second bus 20. A nut 32 threaded on bolt 28 engages the upper end of the spring 30 and applies resilient downward biasing force on the second bus 20. Thus the portion 20A of second bus 20 is biased downwardly toward the portion 14A of first bus 14.

Positioned between the bus portions 14A and 20A is a weighted conductor member 34. Member 34 may be formed of any material which readily conducts electricity and has a high specific gravity. For instance, member 34 may be formed of lead. As another example, member 34 can be formed of steel or any alloy thereof and to improve the conductivity thereof it may be coated with copper. Of course, any alloy of copper would serve perfectly.

The weighted conductor member 34 is retained in position between the bus portion 14A and 20A by friction, and is thereby displaceable by any sudden velocity change of the vehicle. Acceleration changes are relatively small compared to the change of velocity which occurs in an accident wherein the vehicle is involved in any impact with another vehicle or with a bridge, embankment, building or whatever. The weighted conductor member 34 will remain in position unless and until the vehicle is involved in an impact. The amount of impact required to displace the member 34 may be regulated by means of nut 32 to vary the tension applied by spring 30. A chain 36 extending between the base 10 and the member 34 retains the member from becoming lost when displaced so that it can be easily reinserted into position.

Affixed to the rearward surface of second bus portion 20B, by means of rivets 38, is a nonconductive member 40. Attached to the lower surface of member 40 is a conducting bar 42. Affixed to the base 10 below the conducting bar 42 is a first switch pole 44 and a second switch pole 46. Each of the switch poles has a screw 44A and 46A respectively in the outer end thereof by means of which the vehicle ignition system may be connected therewith so that the switch poles 44 and 46 are in series with the vehicle ignition system.

With the impact fire safety switch in the actuated condition as shown in FIG. 1A, that is, with the weighted conductor member 34 in position between bus portions 14A and 20A, the conductor bar 42 engages the first and second switch posts 44 and 46 so that continuity is provided between the poles. Thus, in the condition shown in FIGS. 1 and 1B the vehicle electrical and ignition systems are energized.

Figure 2:
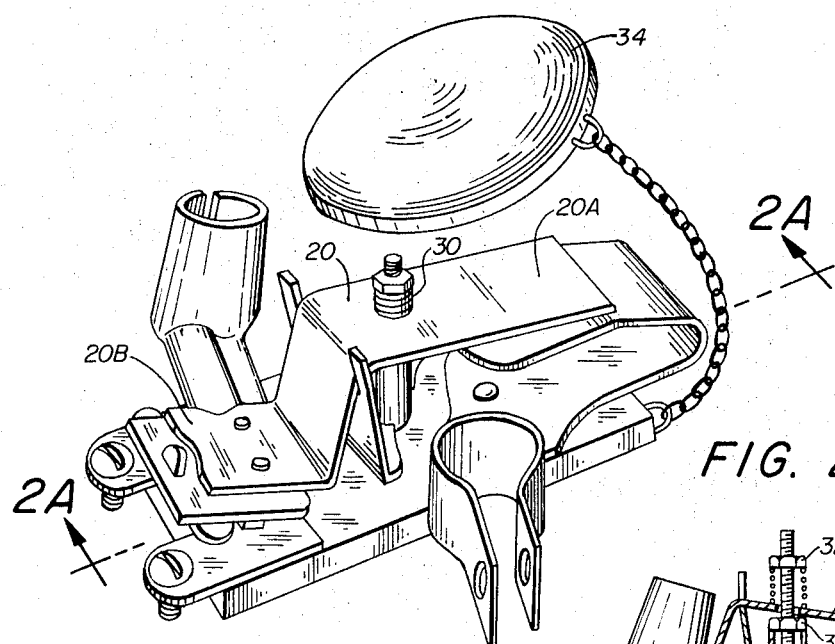
FIG. 2 is an isometric view as shown in FIG 1 but showing the switch in deactuated condition as would occur upon vehicle impact.
Figure 2A:
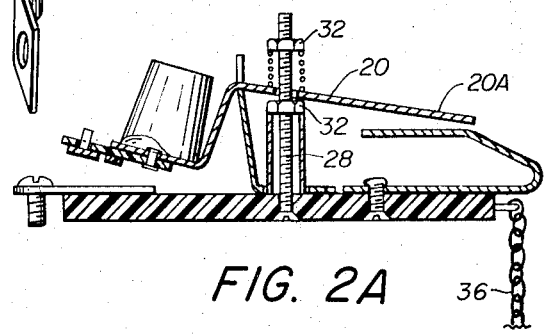
FIG. 2A is a cross sectional view taken along the line 2A—2A of FIG. 2.

FIGS. 2 and 2A show the switch in the deactuated or disarmed condition in which the weighted conductive member 34 has been displaced. Spring 30 urges the bus forward portion 20A downwardly and thereby raises the rearward portion 20B. This raises the conducting bar 42 out of engagement with first and second switch posts 44 and 46, thereby breaking the circuit to the vehicle ignition system. As the second bus forward portion 28 is pivoted downwardly, it does not engage the first bus portion 14A. Since bolt 28 includes a lower nut 48 (See FIG. 1A) it limits the downward travel of the first bus portion 20A.

FIG. 5 is a circuit diagram showing the application of the system in a vehicle ignition system. The vehicle battery 48 normally has one pole grounded. The other pole attaches to clip 18. A cable to the vehicle electrical system vehicle attaches to post 24. Continuity between first bus portion 14A and second bus portion 20A is provided by weighted conductor element 34.

The second switch is connected to the vehicle ignition system so as to stop the vehicle engine upon impact and is formed of conductor bar 42 and first and second switch poles 44 and 46. The switches are simultaneously actuated by the displacement of the weighted conductor member 34.

FIGS. 3 and 3A show an alternate embodiment of the invention. In this arrangement the switch portions are enclosed within a cylindrical housing 52. A longitudinally displaceable rod 54 is normally urged upwardly by spring 56 and held downwardly by means of ball 58. Contact is made with the switches internally of the device to provide electrical continuity between posts 60A and 60B which are positioned in the vehicle electrical system and between posts 62A and 62B which are in series with the vehicle ignition system. A base 64 extends across the top of the housing and has an opening therein threadably receiving an adjusting screw 66. Ball 58 is retained between the lower portion of the adjusting screw and the upper portion of rod 54. Upon impact the ball 58 is displaced from between the screw 66 and poles 54, opening the switches. A chain 68 prevents the ball 58 from being lost when it is displaced upon vehicle impact.

FIG. 4A shows the device in the alternate embodiment having been deactuated by vehicle impact so that the switches to the vehicle electrical and ignition system are opened.

The alternate embodiment shows an arrangement wherein the weighted member which is displaced by vehicle impact in this case the ball 58 is not a conductive element but functions only as a means of actuating the switches to prevent a fire upon vehicle impact.

It can be seen that the switches of this invention may take on many alternate physical arrangements and embodiments without departing from the spirit and scope of this disclosure. While the invention has been described with a certain degree of particularity it is manifest that many changes may be made in the details of construction and arrangement of components without departing from the spirit and scope of the disclosure.

What is claimed is:

1. With an engine driven vehicle having a vehicle electrical system and an engine ignition system, an impact fire safety switch, comprising:
    a base member;
    a first current carrying support member affixed to said base member;
    a second current carrying support member pivotally supported to said base member in insulated and spaced relationship to said first current carrying support member, said current carrying support members being connectable in electrical series with the vehicle electrical system;
    biasing means normally urging said second support member towards said first support member;
    a current carrying inertial member normally retained between said support members, said inertial member being displaced by vehicle impact; and
    an ignition switch means supported to said base member, said ignition switch means being connectable in electrical series with the engine ignition system, said ignition switch means being connected to said second support member and being deactivated when said second support member pivots towards said first support member when said inertial member is displaced.

2. An impact fire safety switch according to claim 1 in which said ignition switch means includes:
    a first contact means supported on said base; and
    a second contact means supported in insulated relation to said second current carrying support member, said first and second contact means being connected in series with said engine ignition system and held in normal contacting relationship when said inertial members are positioned between said support members, said contact means being separated when said second support member pivots towards said first support member as said inertial member is displaced by vehicle impact.

3. An impact fire safety switch according to claim 1 including means of adjustably varying said biasing means.

4. An impact fire safety switch according to claim 1 wherein one of said current carrying support members includes integral means for accepting and connecting to a battery terminal post.

* * * * *